United States Patent
Beneker et al.

(10) Patent No.: US 7,512,470 B2
(45) Date of Patent: *Mar. 31, 2009

(54) COCKPIT OF AN AUTOMOTIVE VEHICLE WITH A STEERING WHEEL AND AN ADJUSTABLE SEAT

(75) Inventors: Wilfried Beneker, Leichlingen (DE); Stefan Ungnau, Solingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 770 days.

This patent is subject to a terminal disclaimer.

(21) Appl. No.: 10/955,267

(22) Filed: Sep. 30, 2004

(65) Prior Publication Data

US 2005/0125106 A1    Jun. 9, 2005

(30) Foreign Application Priority Data

Oct. 22, 2003    (DE) .................................. 103 49 532

(51) Int. Cl.
*G06F 17/00* (2006.01)
*B62D 1/18* (2006.01)

(52) U.S. Cl. ......................................... 701/49; 280/775
(58) Field of Classification Search .................... 701/49
See application file for complete search history.

(56) References Cited

U.S. PATENT DOCUMENTS

| 5,292,178 | A | * | 3/1994 | Loose et al. ............. 297/344.1 |
| 5,555,502 | A | * | 9/1996 | Opel ........................... 701/36 |
| 6,240,347 | B1 | * | 5/2001 | Everhart et al. ............... 701/36 |
| 6,388,655 | B1 | * | 5/2002 | Leung ........................ 345/157 |
| 6,390,505 | B1 | * | 5/2002 | Wilson ....................... 280/775 |
| 6,571,154 | B2 | * | 5/2003 | Worrell et al. ................. 701/1 |
| 6,830,123 | B2 | * | 12/2004 | Ohki et al. .................. 180/326 |
| 2002/0091473 | A1 | * | 7/2002 | Gardner et al. ................ 701/35 |
| 2002/0188393 | A1 | * | 12/2002 | Yokota et al. ................. 701/45 |

* cited by examiner

*Primary Examiner*—Thomas G Black
*Assistant Examiner*—Sarah S Shin
(74) *Attorney, Agent, or Firm*—Cantor Colburn LLP

(57) ABSTRACT

A driver's compartment of an automotive vehicle including a steering wheel, an underbody, a seat, the seat having an underframe connected to the underbody, a seat pan carried by the underframe, a seat back and an adjusting device for adjusting the seat toward the steering wheel and away therefrom, a control circuit being associated with said adjusting device.

13 Claims, 3 Drawing Sheets

COCKPIT OF AN AUTOMOTIVE VEHICLE WITH A STEERING WHEEL AND AN ADJUSTABLE SEAT

TECHNICAL FIELD OF INVENTION

The invention relates to the driver's compartment (cockpit) of an automotive vehicle with a seat, with an adjustable steering wheel comprising at least one adjusting device for adjustment thereof and with a control circuit that is connected to said adjusting device.

BRIEF DESCRIPTION OF RELATED ART

Nowadays, the steering wheels of modern automotive vehicles are in most cases equipped with a motor-driven adjusting device for adjustment of the steering wheel in the longitudinal direction of a steering column, meaning toward and away from a driver, and with an adjusting device for tilting the steering wheel about a horizontal axis. According to prior art, a switch is associated with every single adjusting device for actuating the same. Said switches are for example disposed on one side of the steering wheel or on the dashboard. Further, prior art memory mechanisms are known by means of which several users may store their individually defined steering wheel positions so that the steering wheel can be returned to these positions after it has been displaced.

In prior art, purely mechanically-operated adjusting devices are known that are brought purely mechanically from the normally locking state into an enabling state e.g., adjusting devices for manual adjustment of the angle. The invention does not relate to such type adjusting devices. It relates to adjusting devices in which at least switching from the normal locking state to the adjustable state can be electrically triggered. It preferably relates to motor driven, more specifically to electric motor driven, adjusting devices.

BRIEF SUMMARY OF THE INVENTION

The purpose of the invention is to simplify adjustment of a steering wheel in an automotive vehicle. The invention develops the previously known passenger compartments so as to permit a particularly evident setting of the passenger compartments and to more specifically achieve an evident setting of the adjusting possibilities for the steering wheel.

In accordance with the invention, the at least one adjusting device is moved in the very direction in which the user pushes himself away from the steering wheel or pulls himself closer toward said steering wheel. Accordingly, the direction of movement or the force exerted by the user which are associated to the adjustment wanted are respectively recorded. If a user wants to adjust the steering wheel so as to move it forward, meaning toward the dashboard, he will push the steering wheel away being thereby supported by the seat. The seat absorbs the reaction force. By pushing the steering wheel away, the user almost automatically actuates the at least one associated sensor so that the steering wheel is moved away from him. If the user wants to move the steering wheel towards him, he pulls himself, and with him the seat, toward the steering wheel, thereby actuating at least one second sensor so that a corresponding adjusting movement is completed in the desired direction.

The various adjusting movements are thereby previously enabled, and as a result thereof made possible, by the control circuit. The control circuit has at least one adjusting mode. If it is selected, the at least one adjusting device can be moved for adjustment. Preferably, several adjusting devices are provided and the control circuit has several adjusting modes that are preferably sequentially offered to the user or that can be selectively chosen by him.

The great advantage of the invention is that the adjusting device is haptically controlled. The user performs the very movement he wants the steering wheel to be adjusted to execute. This makes adjustment evident and easily understandable. The invention is more specifically suited for an adjusting device that operates in a direction substantially leading toward the steering wheel and away therefrom and additionally for tilt adjustment of the steering wheel.

In a particularly preferred developed implementation, the seat is also adjustable through the sensors disposed on the steering wheel. As actually well known, the seat has adjusting devices for the lengthwise adjustment of the seat relative to an underbody, for the tilt adjustment of the seat back, for the height of a seat pan, and so on. The same advantage is thereby obtained than with the adjustment of the steering wheel, which is that the seat can be adjusted in the very direction of the force a user exerts on the seat.

It is generally preferred that the user continues to hold the steering wheel in the normal position while adjusting the steering wheel and/or the seat. Preferably, suited sensors are configured on the steering wheel, said sensors recording, in addition to the sensors described, further movements of the steering wheel such as upward or downward movement of the steering wheel, tilting of the steering wheel about a vertical or horizontal axis. At need, the sensors provided can be utilized to also record such type movements. Preferably, the movements the user imparts to the steering wheel are performed by the adjusting devices in a parallel direction or in a substantially parallel direction. Accordingly, the user causes the steering wheel to tilt by accordingly moving the steering wheel upward or downward, meaning in the direction wanted. The same applies, by way of example, to the height adjustment of a front edge of the seat. Again, the user pulls the steering wheel upward or pushes it down in order to accordingly adjust the height of the seat's front edge. At least one sensor records this movement of the user. Preferably, several sensors are provided for each direction of movement.

In a development, the overall device can also be designed in such a manner that other adjusting devices may additionally be operated without the user directly exerting a force between the part to be adjusted and the sensors. An adjustable, motor-driven mirror, see e.g., DE 26 08 919 C2, may thus for example be adjusted through the sensors, the same applying to tilt adjustment of the steering wheel, actuation of a car radio, and so on. Adjusting devices of the seat that are substantially oriented from the top toward the bottom such as for example the height adjustment of the seat's front edge may also be enabled. Additional sensors may be provided on the steering wheel for this purpose, said sensors registering e.g., that the steering wheel is being tilted about a horizontal axis and accordingly controlling the adjusting movement. The sensors preferably utilized are strain gauge devices or other force sensors. They permit to detect the for example substantially vertical upward or downward movement of the steering wheel initiated by the user holding the steering wheel in the normal position, meaning with the hands in the 3 o'clock and 9 o'clock position. This direction of movement is substantially parallel to the height adjustment of the front edge of the seat or to the height adjustment of a headrest for example. Inasmuch, the association is evident in this case as well.

BRIEF DESCRIPTION OF THE DRAWINGS

Further advantages and characteristics of the invention will become apparent upon reading the remaining claims and the following non restrictive description of embodiments thereof, given by way of example only with reference to the drawing. In said drawing:

DETAILED DESCRIPTION OF THE INVENTION

Figure 1:
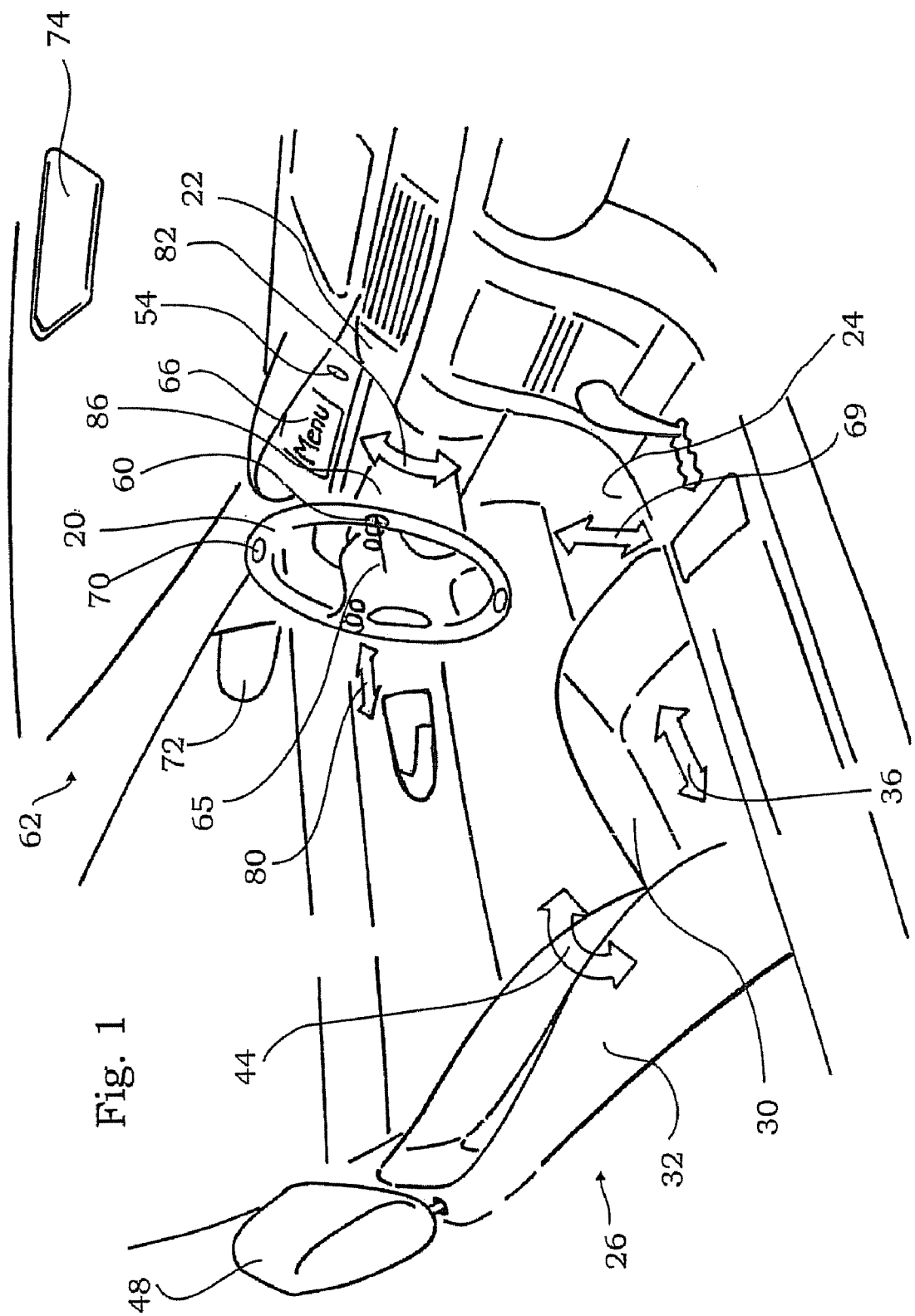
FIG. 1 is a perspective inside view of a cockpit as viewed for example by a front-seat passenger.
Figure 2:
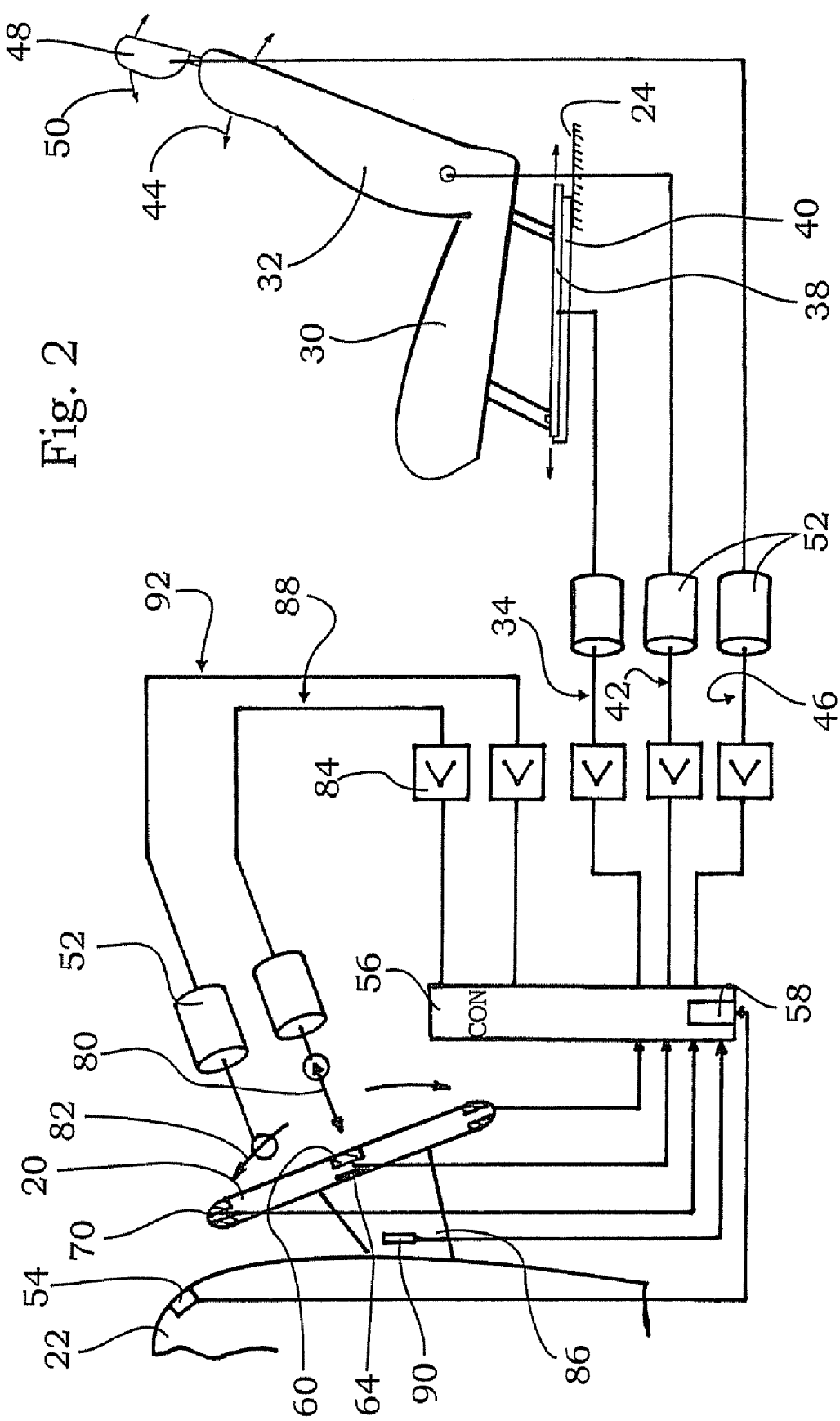
FIG. 2 is a side view of a steering wheel with the associated portion of the console and with an electric circuit in the form of a block diagram.

FIG. 1 shows a driver's compartment or cockpit of an automotive vehicle. The cockpit comprises a steering wheel 20 projecting from a dashboard 22. The cockpit further has an underbody 24 and a seat 26. The latter has an underframe 28 (see FIG. 3) that is connected to the underbody 24, a seat pan 30 that is carried by the underframe 28 and a seat back 32. The steering wheel 20 has two adjusting devices. It has an adjusting device 88 for forward and backward adjustment of the position of the steering wheel 20 pursuant to the double-headed arrow 80. It further has an adjusting device 92 that operates pursuant to the double-headed arrow 82 and allows tilting of the steering wheel about a horizontal axis. The two adjusting devices 88, 92 are schematically illustrated in FIG. 2 by an amplifier 84 and an electric motor 52 each. Such type adjusting devices including the respectively required motor drives and the like are known in principle and pertain to the prior art. The reader is referred, by way of example only, to U.S. Pat. No. 5,113,716 and U.S. Pat. No. 5,419,581.

The seat also has a plurality of adjusting devices, three different adjusting devices taken among this plurality of adjusting devices being shown in FIG. 2. A lengthwise adjustment device 34 is provided. It permits to displace the seat rail 38 on each seat side relative to the respective one of the floor rails 40 on each seat side in the direction pursuant to the double-headed arrow 36. The floor rail 40 is connected to the underbody 24. There is further provided a tilt adjusting device 42 for tilt adjustment of the seat back 32, the adjustment being performed pursuant to the double-headed arrow 44. Such type adjusting devices are known in principle, see e.g., U.S. Pat. No. 5,275,457 and U.S. Pat. No. 6,299,252. There is eventually provided a forward and backward adjusting device 46 for a headrest 48, the adjustment being performed pursuant to the double-headed arrow 50.

All of the three adjusting devices 34, 42, 46 are equipped with an electric motor 52 each, as can be seen from the schematic illustration thereof shown in FIG. 2.

An input means 54 is provided on the dashboard 22, in the instant case it is implemented as a microphone for voice input and control which will still be discussed in closer detail hereinafter.

A control circuit 56 that is connected to all of the adjusting devices 34, 42, 46 is provided. Its basic functions are similar to those of the prior art memory devices for seat adjustment. It moreover has additional functions that will be explained in closer detail hereinafter.

The input means 54 is connected to the control circuit 56 and is provided additionally for this purpose with a microphone amplifier and a speech evaluation circuit 58. Two first sensors 60 are disposed on the steering wheel 20 that is in the position in which the automotive vehicle is traveling in a straight line. They are located on the surface of the ring of the steering wheel 20, said surface being substantially directed toward the seat 26 and, as a result thereof, opposing the normal direction of travel of the automotive vehicle 62. A first sensor 60 is in the 9 o'clock position and another first sensor 60 is in the 3 o'clock position, meaning they are disposed respectively completely to the left and completely to the right on the steering wheel. Second sensors 64 are respectively disposed exactly opposite. They are mounted to the surface of the steering wheel ring that is turned away from the seat 26. They are accordingly directed substantially in the direction of travel. The first sensors 60 are separated from the second sensors 64 by the thickness of the steering wheel ring only. The sensors 60, 62 are located at the very site at which the driver's right and left hand typically rest on, and take hold of, the steering wheel ring. The ball of the thumb or the thumb of each hand rests on the first sensor 60 while the base of the four fingers substantially rests on the second sensor 64.

In their simplest configuration, the sensors 60, 64 are switches e.g., membrane switches as they are known from the computer sector, or microswitches or the like. Such type sensors only perform the simple function of switching on and off, so that they correspond to a single-break switch. They are only enabled above a certain pressure as this is in principle known for switches.

As shown in FIG. 2, the various sensors 60, 64 are connected to the control circuit 56. It is indicated at CON. Adjustment of the seat proceeds as follows:

At first, the control circuit 56 is brought from its normally locked state into its activated state. It is activated through the input means 54. For this purpose, the user must enter a corresponding input. He may for example enter a standardized speech command "select steering wheel position". He may also be asked by a speech output whether he would like to select a steering wheel position. If the user answers "yes", the control circuit is activated, meaning the adjusting state is selected. The user may also enable a switch and so on. In principle, the adjusting devices 88, 92 can only be adjusted after unlocking. No adjustment can be made in the locked state.

The control circuit 56 now offers in sequence two adjusting modes. It first offers the adjusting mode for adjusting the steering wheel 20 toward and away from the user. This is rendered by spoken output or displayed on a screen 66 or in another way. The user now knows that he can cause the steering wheel 20 to be adjusted toward a steering column 86. Adjustment is performed via the sensors 60, 64. If the user wants to pull the steering wheel 20 towards him pursuant to the double-headed arrow 80, he must actively dictate this movement, that is to say he must pull the steering wheel 20 towards him. He thus actuates at least one of the two sensors 64. The control circuit 56 registers the switching process of at least one of the two sensors 64 and accordingly controls the adjustment device 88 so that the motor 52 of this adjusting device 88 moves the steering wheel 20 towards the user. Adjustment will be performed as long as the user keeps at least one of the second sensors switched on.

As soon as the desired adjustment of the steering wheel 20 has been achieved, the user reduces the force he exerts onto the steering wheel 20. As a result, the two sensors 64 are in the off-state. The control circuit registers this and accordingly stops the adjusting device 88.

If however the user has pulled the steering wheel too far towards him and wants to move it slightly forward again, he will push the steering wheel 20 forward. As a result, at least one of the two first sensors 60 will be switched to the on-state. The control circuit 56 now actuates the adjusting device 88 in the forward direction until the pressure onto the at least one sensor is again reduced.

In order to switch to the next adjusting mode, namely the one for tilt adjustment of the steering wheel 20 pursuant to the double-headed arrow 82, an appropriate step must be performed. In the exemplary embodiment shown, the control circuit displays on the screen 66 or renders by spoken output the question "forward/backward adjustment completed?". If the user audibly answers "yes" the control circuit passes e.g., to the next operation mode, namely the tilt adjustment of the steering wheel 20. If the user wants to tilt the steering wheel 20 upward about a horizontal axis, he will push the steering wheel 20 accordingly, the adjusting device 92 performing the adjustment. Actually, the processes are the same as before. Sensors 90 for recording the tilting force exerted onto the steering wheel 20 are preferably disposed on the steering column 86. It is also possible to utilize other sensors as long as they register a tilting force at the steering wheel 20.

The seat is adjusted accordingly. The control circuit also offers adjusting modes for adjustment of the seat, for example three adjusting modes in sequence. The first adjusting mode is for example provided for a lengthwise adjustment device 34. Again, adjustment is performed via the sensors 60, 64. If the user wants to adjust the seat 26 backward pursuant to the double-headed arrow 36, he must actively dictate this movement, meaning he must build up a force between the hands resting on the steering wheel 20 and the back resting on the seat back 32. He thus actuates at least one of the two sensors 60. The control circuit 56 registers this and controls the lengthwise adjustment device 34 in such a manner that the two seat rails 38 of the pairs of rails are displaced backward relative to the floor rails 40. Adjustment is thereby performed by the associated electric motor 52.

In the next adjusting mode, that is the one for tilt adjustment of the seat back 32, the sensors 60, 64 may also be utilized. If the user wants to further recline the seat back 32 backward, he will push himself back thereby pushing against at least one of the two first sensors 60. The control circuit registers this switching state and sends to the tilt adjusting device 42 the control command to become operative. The associated electric motor 52 adjusts the tilt of the seat back accordingly as long as the sensor is actuated.

The third adjusting mode for adjustment of the seat 26 is achieved accordingly, with the adjusting device 46 for the head rest 48 being now addressed. The sensors 60, 64 are utilized here.

The steering wheel and the existing vehicle seats need not be modified for the implementation described so that prior art steering wheels and vehicle seats may be used. The invention requires modifications of the steering wheel 20, the input means 54 and the control circuit 56.

The adjusting devices 88, 92, 34, 42, 46 discussed herein above have adjustment directions that are substantially oriented toward and away from the steering wheel 20. Here, the user applies a force onto the steering wheel 20 and the reaction force onto the corresponding part e.g., the seat back 32, the direction of the force exerted by the user substantially coinciding with the adjustment direction. In the other adjusting devices, this is no longer the case in this pure form. These other adjusting devices will now be discussed hereinafter:

An example for another adjusting device is an adjusting device 68 for adjusting the height of the front edge of the seat, which will be referred to hereinafter as SFE-adjusting device 68, see FIG. 3. The adjustment is performed pursuant to the double-headed arrow 69 (FIG. 1). Again, prior art seats can be used, the seat itself will not have to be modified for the invention. In principle, the first and the second sensors 60, 64 can be used for the SFE-adjusting devices 68, see Fig. 3 It has been found however that it is more advantageous to provide further sensors. In FIG. 2 for example, sensors are respectively provided on the side of the steering wheel 20 that is turned toward the seat as well as on the side turned away therefrom in the 12 o'clock and in the 6 o'clock position of said steering wheel 20, they are referred to as third sensors 70. Upon actuation thereof, the front edge of the seat is adjusted in an manner analogous to that described herein above. For this purpose, a fourth control mode is provided in the control circuit 56.

In this embodiment, the user must however change the position of his hands, at any rate the position of at least one hand, on the steering wheel 20. He must be apprised of this before, though. It has been found out that it is advantageous to configure the third sensors, and preferably all of the sensors, as sensors capable of measuring the force, for example as strain gauge devices, also referred to as SGs. Said sensors record, i.a., the forward and backward tilt of the steering wheel 20 about a horizontal axis, an upward or downward movement of the steering wheel 20 respectively and/or any other force acting upon the steering wheel 20. The same effect is achieved as with the sensors 60, 64, 70, 90 which are shown in FIG. 2 and are configured there as switch sensors. In the present case however, the user must no longer move his hands to place them onto the sensors, he only needs to tilt, push, pull the steering wheel upward or downward and so on.

There are still further adjustment possibilities as can be seen more specifically from FIG. 1. This Figure further shows an outside rearview mirror 72 and an inside rearview mirror 74 that are adjustable by being motor-driven, both being adjustable about two different pivot axes. The inclination of the steering column may also be adjustable. In the control circuit 56, corresponding adjusting modes are provided for these adjustments. If they are active, adjustment can be performed by actuating corresponding sensors on the steering wheel 20. Here again, force sensors are advantageous because they are capable of recording any force applied onto the steering wheel by the user. The various forces are represented in FIG. 2 by the plurality of arrows 80, 82. The recording of the forces applied to the steering wheel can be controlled in such a manner that it corresponds to the movements the user would complete if he were to adjust directly the mirror by holding it directly with both hands placed on the left and on the right side of the mirror. This permits very advantageous assignment of the movements transmitted to the steering wheel 20 so that the mirror is adjusted in accordance with the forces exerted onto said steering wheel 20.

Figure 3:
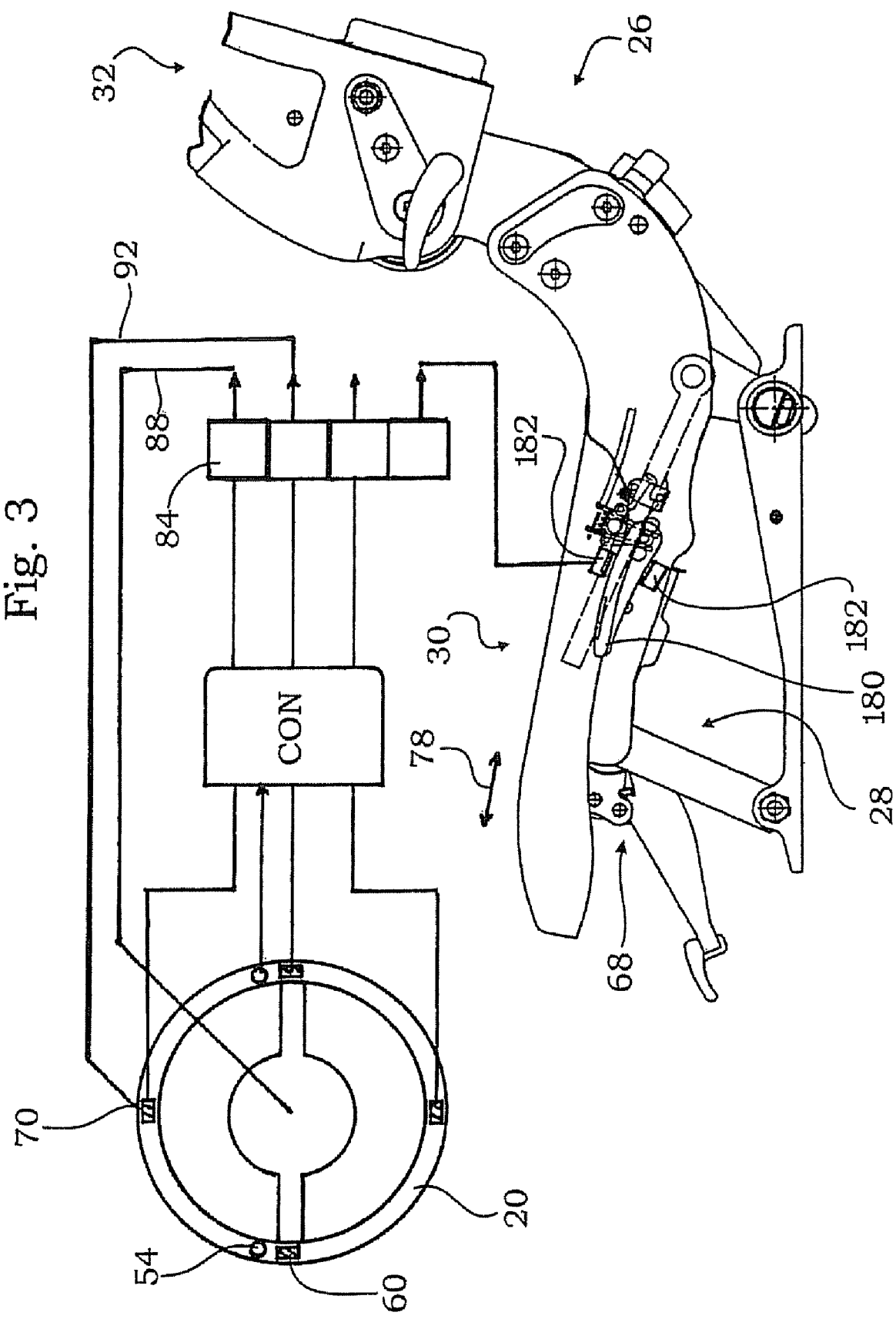
FIG. 3 is a top view of a steering wheel with two push buttons serving as input means and one mechanically adjustable seat.

FIG. 3 shows a steering wheel that is substantially equipped with strain gauge devices forming the sensors 60, 64, 70. Such type sensors can be disposed anywhere on the steering wheel 20, also in or on the steering column, provided they record in the best possible way the forces acting onto the steering wheel only. In the embodiment in accordance with FIG. 3, the input means 56 is realized by two push-button switches 56. As long as at least one of these buttons is pressed down, for example by the thumb of a user, the control circuit 56 is in the activated state. Releasing the push button 54 can be used for passing to the next adjusting mode and/or for selecting the locked state of the control circuit 56.

FIG. 3 further shows a seat the adjusting device of which has no motor and is adjustable by the adjusting force applied by the user. Such type seats are also suited for the invention. The tilt of the front and rear parallelogram bars is adjustable. As a result, the seat pan is adjusted pursuant to the double-headed arrow 78. The adjusting device is described in the patent application "Adjustable vehicle seat, more specifically integrated seat" that was filed today by the same applicant, this application being fully incorporated herein by reference and the entire application being intended to be included in the disclosure of the present application.

The normally locked adjusting device is unlocked by pivoting a hand lever 180. If said hand lever is pivoted in a direction of rotation, adjustment is allowed to occur in one direction of the double-headed arrow 78. Two electromagnets 182 perform the same function as the hand lever, a respective one of them being responsible for allowing adjustment to be performed in one direction of the arrow. Said electromagnets are activated by the control circuit 56. If one magnet is actuated, the seat pan can be adjusted, the user having to apply the adjusting force. The adjusting devices 88, 92 of the steering wheel can be unlocked in much the same way and can also be adjusted manually.

The steering wheel 20 can be adjusted accordingly. The previously known steering wheel disclosed in U.S. Pat. No. 5,306,032 can for example be modified in such a manner that the device is unlocked electrically instead of manually before it is locked again. The reader is also referred to the steering wheel in accordance with U.S. Pat. No. 5,259,264.

Hereto before, serial interrogation or serial operation of the various adjusting modes has been described. It is absolutely possible to enable several adjusting devices simultaneously. Accordingly, in a first adjusting mode, at least two, but possibly all, adjusting devices of the seat are for example enabled. By applying the corresponding force onto the steering wheel 20, the user initiates the desired movement. It has thereby been found advantageous to enable the elements one by one, for example the vehicle seat, the outside rearview mirror, the inside rearview mirror, the steering column or a radio.

Where the application speaks of a sensor being disposed on a side of the steering wheel that is turned toward the seat, it substantially intends to describe its function; in fact, the sensor may also be disposed somewhere else provided it is responsive only to a pressure that is applied approximately at the site where the first sensor is intended to be positioned in accordance with the description, meaning for example in the 3 o'clock and in the 9 o'clock position. This more specifically relates to sensors that are configured to be force sensors e.g., SGs. Sensors that are configured to be merely switches are by contrast to be disposed preferably on those sites onto which a user applies the force, meaning for example pursuant to arrow 65.

One of the sensors 60, 64, 70 can also be used as an input means 54. For this purpose, an appropriate signal is to be agreed upon with the control circuit 56, e.g., a pressure exerted onto the steering wheel in one direction during three seconds will unlock the control circuit 56.

The invention claimed is:

1. A driver's compartment of an automotive vehicle, comprising:
    a seat;
    an adjustable steering wheel comprising at least one adjusting device for adjustment thereof;
    a control circuit that is connected to said adjusting device;
    an input means permitting to selectively bring the control circuit from a normally locked state into an activated state, the adjusting device being adjustable in the activated state only;
    sensors which are connected to the control circuit are disposed on the steering wheel, said sensors comprising:
    a) at least one first sensor being responsive to a first force exerted only in a direction leading away from the seat toward the steering wheel and at least one second sensor being responsive to a second force exerted onto the steering wheel only in a direction opposite to said first force wherein the first sensor controls an adjusting backward movement of the adjusting device of the steering wheel which is thus moved forward and accordingly away from the seat and wherein the second sensor controls an adjusting forward movement of the adjusting device which is thus moved toward the seat, and/or
    b) at least one third sensor responsive only to a third force that causes the steering wheel to tilt about a horizontal axis wherein said third sensor controls an adjusting movement of the adjusting device of the steering wheel about the horizontal axis,
    wherein each of the first sensor, second sensor, and third sensor are individually accessible and touchable by an occupant of the seat.

2. The passenger compartment in accordance with claim 1, wherein the at least one adjusting device for the steering wheel is a forward and backward adjusting device and/or an adjusting device for tilt adjustment of the steering wheel.

3. The passenger compartment in accordance with claim 1, wherein the control circuit comprises either several control modes and is designed in such a manner that each of the adjusting devices can be addressed selectively via the input means or comprises one control mode by means of which several adjusting devices are controllable simultaneously.

4. The passenger compartment in accordance with claim 1, wherein the first sensor and the second sensor are disposed on the steering wheel so as to be within the range of a user's hands normally holding the steering wheel.

5. The passenger compartment in accordance with claim 1, wherein the input means comprises a sensor.

6. The passenger compartment in accordance with claim 1, wherein the seat comprises at least one adjusting device.

7. The passenger compartment in accordance with claim 1, wherein the at least one adjusting device comprises either a releasable mechanical locking device or a motor drive.

8. The passenger compartment in accordance with claim 3, wherein the steering wheel comprises at least one third sensor.

9. The passenger compartment in accordance with claim 1, wherein either the sensors enables in the control circuit, upon actuation by the hand of a user, switching between an on-state and an off-state or the sensors comprise a force sensor.

10. The passenger compartment in accordance with claim 9, wherein the force exerted onto the force sensor is evaluated in the control circuit in such a manner that a speed of the adjusting movement is also controlled, a larger force applied on the sensor resulting in a faster adjusting movement and vice versa.

11. The passenger compartment in accordance with claim 3, wherein the seat comprises an underframe connected to an underbody, a seat pan carried by the underframe, a seat back and seat adjusting device for adjusting the seat toward the steering wheel and away therefrom, the control circuit being associated with said seat adjusting device.

12. The passenger compartment in accordance with claim 1, wherein the input means comprises at least one of a switch and a voice input.

13. The passenger compartment in accordance with claim 7, wherein the motor drive comprises a drive with an electric motor.

* * * * *